: US009395478B2

(12) United States Patent
Fisher et al.

(10) Patent No.: US 9,395,478 B2
(45) Date of Patent: Jul. 19, 2016

(54) BLADE OF LIGHT LUMINAIRE

(75) Inventors: Simon Fisher, Hertfordshire (GB); Oliver Ling, Hertfordshire (GB)

(73) Assignee: GE Lighting Solutions, LLC, Cleveland, OH (US)

( * ) Notice: Subject to any disclaimer, the term of this patent is extended or adjusted under 35 U.S.C. 154(b) by 0 days.

(21) Appl. No.: 13/984,115

(22) PCT Filed: Feb. 7, 2012

(86) PCT No.: PCT/US2012/024077
§ 371 (c)(1),
(2), (4) Date: Aug. 7, 2013

(87) PCT Pub. No.: WO2012/109193
PCT Pub. Date: Aug. 16, 2012

(65) Prior Publication Data
US 2013/0329459 A1  Dec. 12, 2013

Related U.S. Application Data

(60) Provisional application No. 61/440,805, filed on Feb. 8, 2011.

(51) Int. Cl.
| F21V 8/00 | (2006.01) |
| F21S 8/00 | (2006.01) |
| F21S 8/04 | (2006.01) |
| F21V 13/04 | (2006.01) |
| F21V 5/00 | (2015.01) |
| F21V 7/00 | (2006.01) |
| F21W 131/40 | (2006.01) |
| F21W 131/405 | (2006.01) |
| F21Y 101/02 | (2006.01) |
| F21Y 103/00 | (2016.01) |

(52) U.S. Cl.
CPC .............. *G02B 6/0036* (2013.01); *F21S 8/036* (2013.01); *F21S 8/04* (2013.01); *F21S 8/043* (2013.01); *F21V 13/04* (2013.01); *G02B 6/0018* (2013.01); *G02B 6/0035* (2013.01); *G02B 6/0063* (2013.01); *G02B 6/0081* (2013.01); *F21V 5/004* (2013.01); *F21V 7/0091* (2013.01); *F21W 2131/40* (2013.01); *F21W 2131/405* (2013.01); *F21Y 2101/02* (2013.01); *F21Y 2103/003* (2013.01); *G02B 6/0028* (2013.01)

(58) Field of Classification Search
USPC .................. 362/576, 559, 602, 604, 546, 547
See application file for complete search history.

(56) References Cited

U.S. PATENT DOCUMENTS

| 4,903,172 | A | * | 2/1990 | Schoniger et al. | ............ 362/612 |
| 5,150,960 | A | * | 9/1992 | Redick | .......................... 362/497 |
| 5,390,436 | A | * | 2/1995 | Ashall | .............................. 40/546 |
| 6,241,369 | B1 | * | 6/2001 | Mackiewicz | .................. 362/368 |

(Continued)

FOREIGN PATENT DOCUMENTS

| CN | 2594814 Y | 12/2003 |
| CN | 2725942 Y | 9/2005 |

(Continued)

*Primary Examiner* — Laura Tso
(74) *Attorney, Agent, or Firm* — Fay Sharpe LLp

(57) ABSTRACT

A luminaire comprising a rectangular waveguide is provided. The waveguide includes four sides and opposed planar surfaces. A light module directs light into only one of the sides at least. One of the planar surfaces includes a specular reflection surface directing light to exit through the opposed planar surface.

20 Claims, 4 Drawing Sheets

(56) References Cited

U.S. PATENT DOCUMENTS

| | | | |
|---|---|---|---|
| 6,305,109 B1* | 10/2001 | Lee | 40/546 |
| 6,341,440 B1* | 1/2002 | Lee | 40/546 |
| 6,457,270 B1* | 10/2002 | Stark et al. | 40/570 |
| 6,539,656 B2* | 4/2003 | Maas et al. | 40/546 |
| 6,742,907 B2 | 6/2004 | Funamoto | |
| 7,160,016 B2* | 1/2007 | Yu et al. | 362/620 |
| 2002/0139023 A1* | 10/2002 | Gianotti et al. | 40/546 |
| 2006/0107568 A1* | 5/2006 | Nicholini et al. | 40/546 |
| 2012/0320622 A1* | 12/2012 | Sanders | 362/602 |
| 2013/0307521 A1* | 11/2013 | Aiken | 324/76.11 |

FOREIGN PATENT DOCUMENTS

| | | |
|---|---|---|
| CN | 200989542 Y | 12/2007 |
| CN | 201652083 U | 11/2010 |
| CN | 201897094 U | 7/2011 |
| JP | 2004-1272931 | 4/2004 |
| JP | 4174687 | 11/2008 |
| KR | 10-2010-038840 | 4/2010 |
| WO | WO 2008/066355 | 6/2008 |

* cited by examiner

BLADE OF LIGHT LUMINAIRE

This application claims the benefit of U.S. Provisional Application Ser. No. 61/440,805, filed Feb. 8, 2011, the disclosure of which is herein incorporated by reference.

BACKGROUND

The present exemplary embodiment relates to a luminaire. It finds particular application in conjunction with a luminaire for general illumination in which directed light is desirable, and will be described with particular reference thereto. However, it is to be appreciated that the present exemplary embodiment is also amenable to other like applications.

BRIEF DESCRIPTION

A lighting fixture commonly found in offices and commercial premises is a fluorescent lighting panel. Frequently, such lighting panels comprise an enclosure housing one or more fluorescent tubes and a front diffusing panel. Typically, the diffusing panel is a translucent plastic material or a light transmissive plastic material with a regular surface patterning to promote a uniform light emission. Alternatively, a light reflective louvered front cover can be used to diffuse the emitted light. Such lighting panels are often intended for use in a suspended (drop) ceiling in which a grid of support members (T bars) are suspended from the ceiling by cables and ceiling tiles supported by the grid of support members. The ceiling tiles can be square or rectangular in shape and the lighting panel module is configured to fit within such openings with the diffusing panel replacing the ceiling tile.

Due to their long operating life expectancy (of order 30-50, 000 hours) and high luminous efficacy (70 lumens per watt and higher) high brightness white LEDs are increasingly being used to replace conventional fluorescent, compact fluorescent and incandescent bulbs. Today, many light fixture designs utilize white LEDs (more typically an array of white LEDs) to replace the conventional light source component. Moreover, due to their compact size and long life, compared with conventional light sources, LEDs offer the potential to construct novel and compact lighting fixtures.

Edge-lit lighting panel lamps are also known in which light is coupled into the edges of a planar light guiding panel (waveguiding medium). The light is guided by total internal reflection throughout the volume of the medium and then emitted from a light emitting face. To reduce light emission from a rear face of the panel (i.e. the face opposite the light emitting face), the rear face will often include a light reflective layer. To encourage a uniform emission of light, one or both faces of the light guiding panel can include a surface pattern comprised of a surface roughening that causes a disruption to the light guiding properties of the light guiding panel, at the site of the area resulting in a preferential emission of light at the area.

An advantage of an edge-lit lighting panel lamp compared with a back-lit panel lamp is its compact nature, especially overall depth (thickness) of the lamp which can be comparable with the thickness of the light guiding panel making it possible to construct a lamp of less than 50 mm in depth.

BRIEF DESCRIPTION OF THE INVENTION

According to one embodiment, a luminaire comprising a rectangular waveguide is provided. The waveguide includes four sides and opposed planar surfaces. A light module directs light into only one of the sides. One of the planar surfaces includes a reflective surface directing light to exit through the opposed planar surface.

According to another embodiment, a method for illuminating an area is provided. The method comprises providing a plurality of luminaire, each luminaire comprising a rectangular waveguide including four edges and opposed planar surfaces. Each waveguide includes a light module directing light into only one of the edges. Each waveguide has total internal reflectance and distributes the light throughout the waveguide. Each waveguide further includes a selected emission of light from one or both of the planar surfaces. The luminaires are arranged in the area such that at least one luminaire is mounted in an angled, vertical or horizontal orientation and at least a second luminaire is mounted in a different angled, vertical or horizontal orientation.

According to a third embodiment, a luminaire comprising a rectangular waveguide is provided. The waveguide includes four edges and opposed planar surfaces. A light module directing light into only one of the edges is provided. At least one of the planar surfaces includes a plurality of microlenses directing light to exit the waveguide.

DETAILED DESCRIPTION

Figure 1:
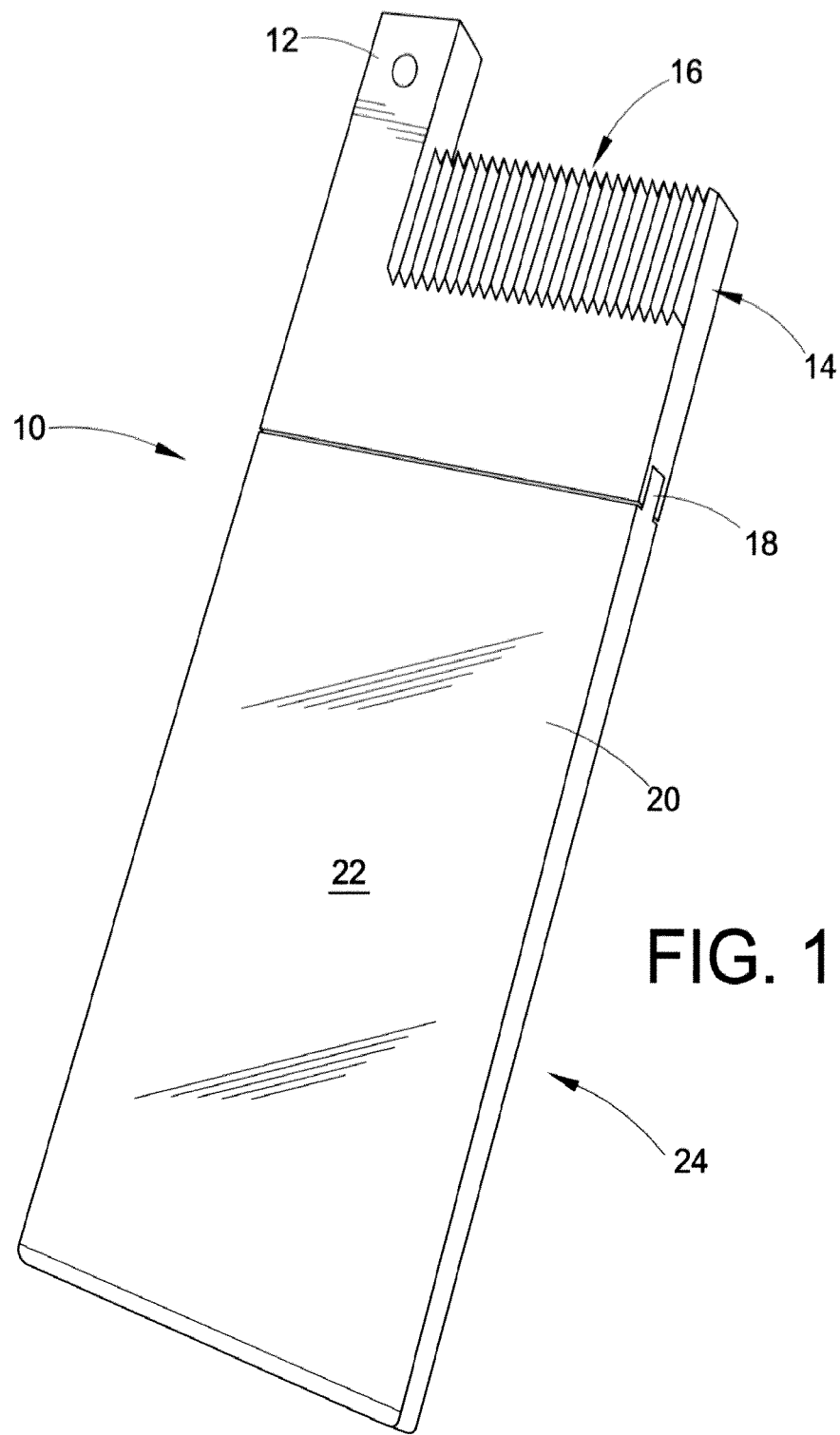
FIG. 1 is a perspective view of the present luminaire.

According to a representative embodiment, a luminaire based on a "blade of light" concept is provided. The blade of light concept refers to a thin profile luminaire where the light is emitted from one or both of the large surface(s) of a rectangular shaped transparent or semi-transparent material called a waveguide. The term waveguide refers to a piece of transparent or semi-transparent material that guides the light through total internal reflection. The light tends to fill the whole volume of the waveguide. The waveguide thickness is small compared to its other dimensions. The thickness of the waveguide and the light source module assembly can be less than 50 mm. Typical waveguide materials include glass (silica, fluoride) or plastic (coated or uncoated) such as acrylates or polycarbonates.

A light source module is attached to only one edge of the waveguide. The light source module can be LED based. The light source module can include a mounting mechanism, such as a bracket, post, arm, shoulder, brace, step, or recess, suited for attaching the luminaire to a wall or ceiling. The mounting mechanism can be a separate component of the light module or integrally formed therewith. The adjacent and opposite edges of the waveguide (to the light source module) are left floating in the air, hence the phrase "blade of light" has been adopted. The edges can be exposed such that light is emitted therefrom or can be covered with a reflecting material.

The light source is hidden in the light source module, which is secured to the edge of the waveguide. Light is directed from the module into the waveguide. Once the light enters the waveguide, it will travel within it. Reflectors and or diffusers installed on the edges other than the one exposed to the light source module can be used to control the amount of light that can exit from the edges of the waveguide. Features on the waveguide can be used to direct the light out of the waveguide in a diffuse manner or at an angle from the waveguide major planar surfaces.

Laser etching, chemical etching and shape painting are currently used as diffuse light extraction features. Alternatively, microlens light distribution features can be used to provide a more tailored and customized light output. The microlens features and their pattern in the light guide or film can be customized to efficiently spread the light across the entire lighting surface or focus it in specific locations depending on the application and illumination requirements. Microlens features enable control of uniformity, exit angle and spread of the light, and can be implemented through a highly repeatable patterning process, enabling high-volume, custom-designed light guides and films. Microlens light distribution features take advantage of highly-efficient specular reflection, versus the diffuse reflection of competing technologies to provide optimum light delivery for edge-lit LED-based lighting fixtures. For example, it is feasible to contain the emitted light to create customized light delivery patterns.

With reference to FIG. 1, a luminaire 10 is depicted. Luminaire 10 includes a support mount 12 for securing to a wall or ceiling. Mount 12 receives a light module 14 that includes LEDs (not shown) and a heat sink 16. A bracket 18 joins light module 14 to one edge of a waveguide 20. Waveguide 20 can emit light from one or both of each major surface 22/24. A mounting arm 27 including passage 29 is provided to receive a post of a wall or ceiling mounting bracket (not shown).

Figure 2:
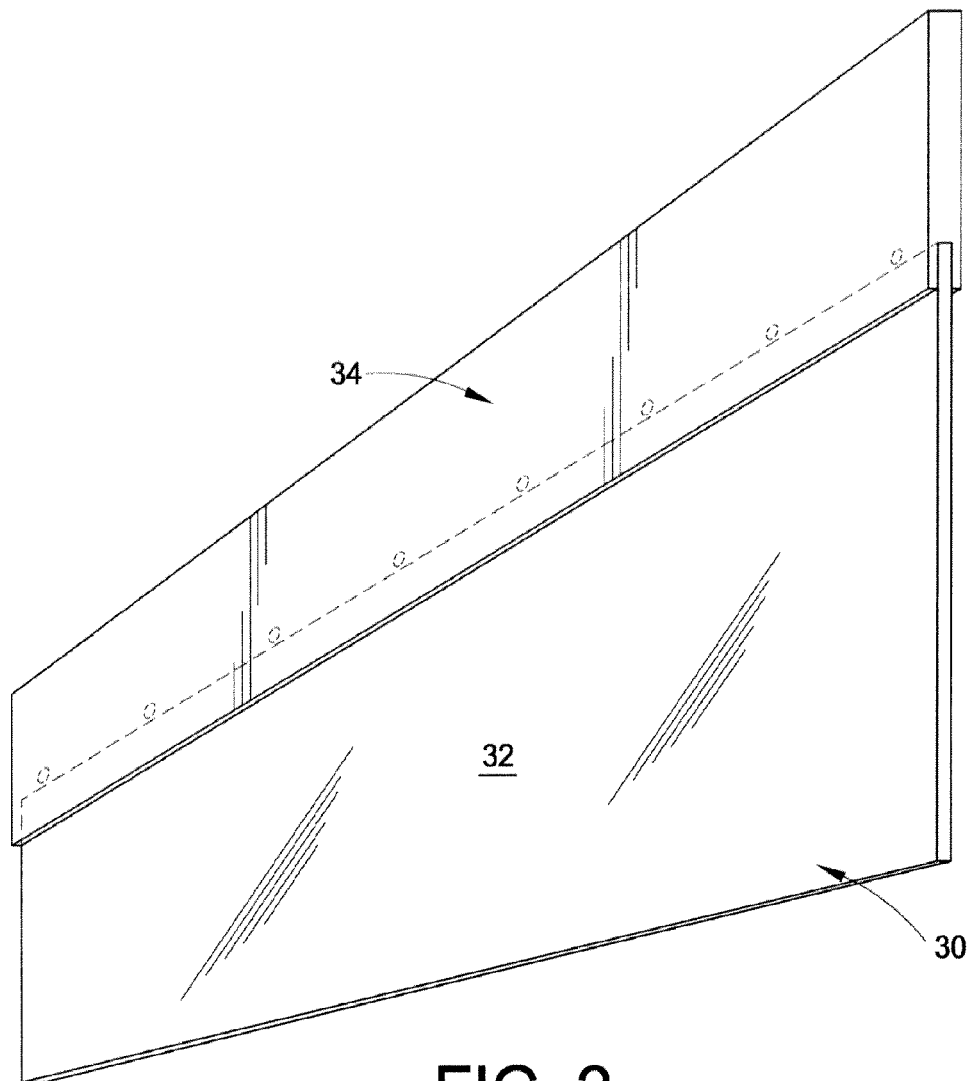
FIG. 2 is a perspective view of an alternative luminaire.

With reference to FIG. 2, an alternative luminaire 30 is depicted. Luminaire 30 includes waveguide 32 which is formed integrally with a light source module receiving housing, 34. Housing, 34 can further include a mounting mechanism (not shown) for securement to a ceiling, a wall or any structure. This feature can allow use of the luminaire for general illumination or to direct light to a surface or object such a wall, shelf, counter top or a display, etc. Luminaires based on the blade of light concept can be installed vertically, horizontally or at any angle. Multiple luminaires can be grouped together to create larger areas of illumination such as a room, hallway, or large spaces such as a warehouse or office.

The luminaire 30 can have a waveguide 32 thickness of, for example, 50 mm or less. Furthermore, the longest edge 31 can have a length of, for example, at least 500 mm and the shortest edge 33 a length of at least 500 mm, such that one planar surface 35 would have a surface of 250,000 mm, resulting in a ratio of at least 5,000:1 relative to the thickness of the edge.

Figure 3:
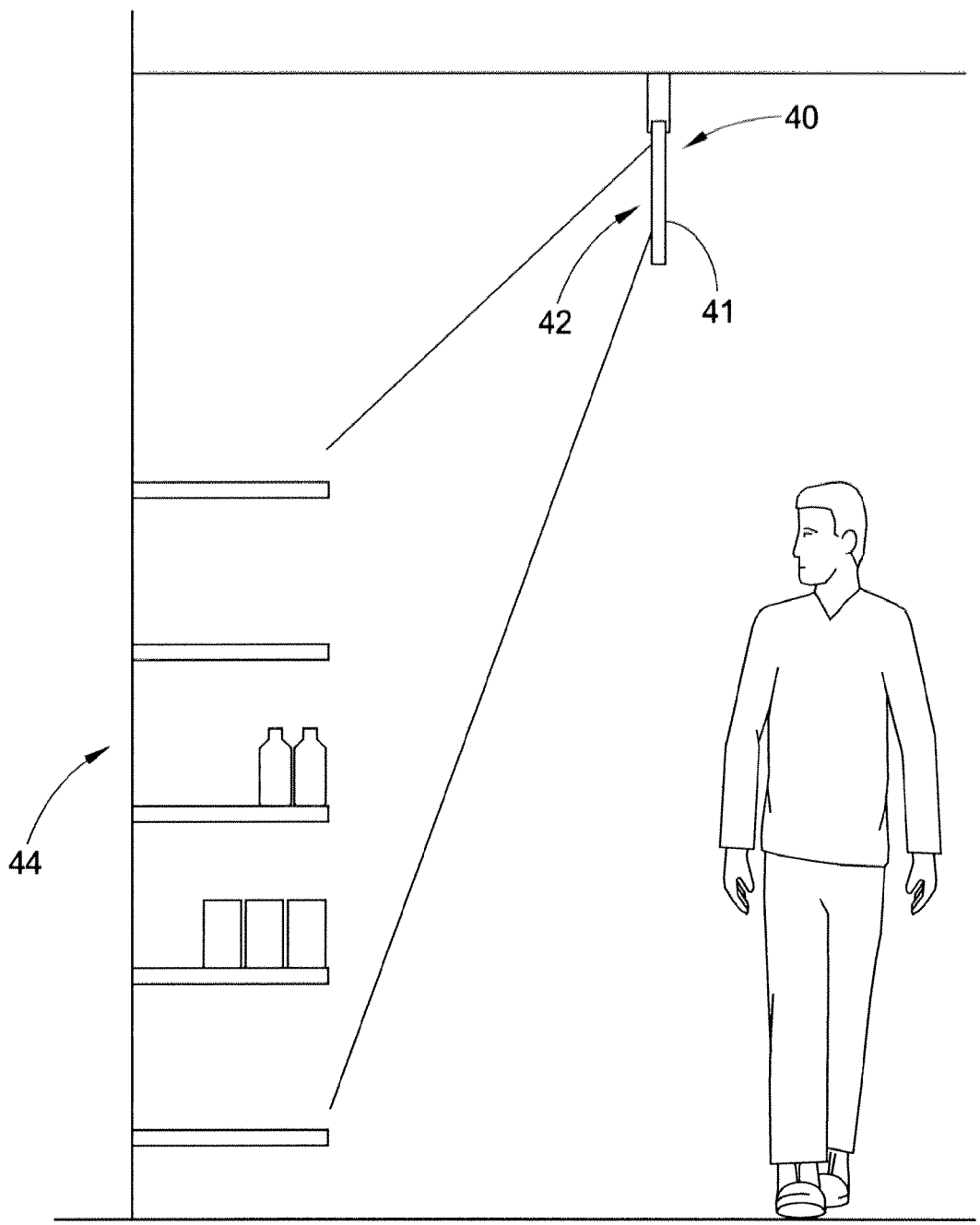
FIG. 3 is a schematic illustration of the directed light of the subject luminaire.

With reference to FIG. 3, it is noted that microlens technology can allow directed light to be emitted from the luminaire 40. Moreover, the light distribution from luminaire 40 is only on one side of the vertically oriented waveguide 41 and is contained within an exit angle defined by cone 42. In this manner, the luminaire can be suspended from the ceiling in a vertical orientation and direct a defined amount of light on an object or location, such as shelves 44. Moreover, the luminaire of this disclosure could be used to direct light on specific areas of a wall, floor, or ceiling. This approach allows specific visual effects to be created and it avoids glare that could result from direct exposure to the light source.

Figure 4:
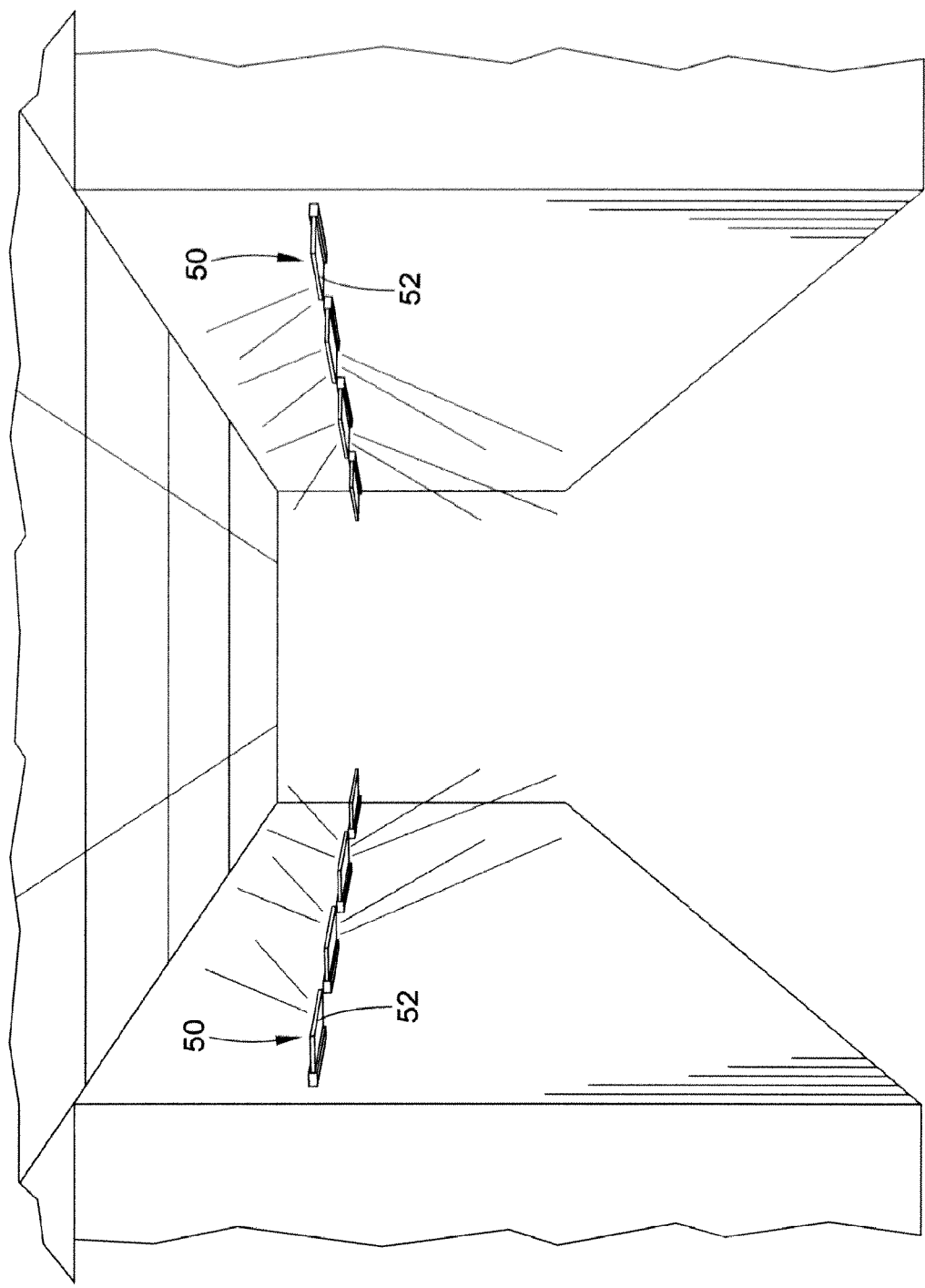
FIG. 4 is a further illustration of the directed illumination of the subject luminaire.

Referring now to FIG. 4, an array of luminaires 50 is depicted. Luminaires 50 are wall mounted and include waveguides 52 in a horizontal orientation. Light distribution can be contained within a cone oriented toward the wall to provide a wall wash effect. For example, a cone of 45° or less may be desirable. It is feasible to tailor the light distribution such that a greater or lesser amount of light is being emitted upwardly or downwardly depending on the requirements of the space being illuminated.

Similarly, it is envisioned that a plurality of the luminaires can be employed to effectively light a large space. For example, wall mounted horizontally oriented luminaires can provide wall washing light while ceiling mounted vertically oriented luminaires with light emitted from a single planar surface can illuminate a display, and ceiling mounted luminaires oriented angularly relative to the ceiling can provide excellent downward illumination of the floor. These are just basic possibilities provided by the present luminaire embodiment. Numerous variations thereon will be readily apparent to the skilled artisan.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A luminaire comprising a rectangular waveguide, said waveguide including four edges and opposed planar surfaces and being configured for installation with said opposed planar surfaces oriented horizontally, a light module directing light into only one of said edges, each of said planar surfaces emitting light, wherein said light is emitted selectively in a greater amount upwardly or downwardly.

2. The luminaire of claim 1, wherein said waveguide has a thickness of less than 50 mm between opposed planar surfaces.

3. The luminaire of claim 1 wherein said light module includes a plurality of light emitting diodes (LEDs).

4. The luminaire of claim 1 wherein said rectangle is a square.

5. The luminaire of claim 1 wherein light is emitted substantially from only one planar surface.

6. The luminaire of claim 2 wherein the ratio of surface area of one planar surface to waveguide thickness is at least 5,000:1.

7. The luminaire of claim 1 including a mounting structure associated with the edge including said light module.

8. The luminaire of claim 7 wherein an edge opposed to said edge including said mounting structure is free floating in a mounted condition.

9. The luminaire of claim 7 wherein said mounting structure and said light module comprise an integral body.

10. The luminaire of claim 1 wherein light exits said planar surface diffusely.

11. The luminaire of claim 1 wherein at least one edge includes a reflector.

12. The luminaire of claim 4 wherein a first planar surface emits more light than the opposed planar surface.

13. A method for illuminating an area comprising providing a plurality of luminaire, each luminaire comprising a rectangular waveguide including four edges and opposed planar surfaces, each waveguide including a light module directing light into only one of the edges, each waveguide having total internal reflectance which distributes said light throughout the waveguide and a selected emission of light from one or both of said planar surfaces, and arranging at least a first of said luminaires in a vertical orientation and a second of said luminaires in a horizontal orientation.

14. The method of claim 13 wherein said first luminaire is mounted to a ceiling and said second luminaire is mounted to a wall.

15. The method of claim 13 wherein each luminaire has substantially the same length, width and thickness.

16. A luminaire comprising a rectangular waveguide, said waveguide including four edges and opposed planar surfaces, a light module directing light into only one of said edges, wherein light is directed to exit said waveguide from at least one planar surface within a cone angle of less than about 45°.

17. A luminaire comprising a rectangular waveguide, said waveguide including four edges and opposed planar surfaces, a light module directing light into only one of said edges, at least one of said planar surfaces emitting light, wherein said light is emitted selectively in a greater amount upwardly or downwardly and wherein light is emitted from at least one of said edges.

18. The method of claim 13 including a plurality of vertical luminaires and a plurality of horizontal luminaires.

19. The method of claim 16 wherein light is directed to exit said waveguide from each opposed planar surface within a cone angle of less than about 45°.

20. The luminaire of claim 1 wherein said light is emitted in a greater amount downwardly.

\* \* \* \* \*